United States Patent
Turaga et al.

(10) Patent No.: US 11,321,306 B2
(45) Date of Patent: May 3, 2022

(54) CLONING OF SANITIZED DATA RECORDS FOR USE IN DATA TESTING ENVIRONMENTS

(71) Applicant: BANK OF AMERICA CORPORATION, Charlotte, NC (US)

(72) Inventors: Durga Prasad Turaga, Murphy, TX (US); Parthiban Tiruvayur Shanmugam, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 104 days.

(21) Appl. No.: 16/885,554

(22) Filed: May 28, 2020

(65) Prior Publication Data

US 2021/0374120 A1  Dec. 2, 2021

(51) Int. Cl.
*G06F 16/23* (2019.01)
*G06F 16/17* (2019.01)

(52) U.S. Cl.
CPC .......... *G06F 16/2365* (2019.01); *G06F 16/17* (2019.01)

(58) Field of Classification Search
CPC .. G06F 16/2365; G06F 16/17; G06F 11/3684; G06F 11/3688; G06F 11/3664
See application file for complete search history.

(56) References Cited

U.S. PATENT DOCUMENTS

| 9,356,966 | B2 | 5/2016 | Patwardhan et al. |
| 10,007,598 | B2 | 6/2018 | Printz et al. |
| 10,318,762 | B1 * | 6/2019 | Buckingham ....... H04L 63/0421 |

* cited by examiner

*Primary Examiner* — Albert M Phillips, III
(74) *Attorney, Agent, or Firm* — Moore & Van Allen PLLC; James C. Edwards (57) ABSTRACT

Cloning of sanitized data records for subsequent provisioning in data test environments. A set of data records of a specified number that meet predefined testing criteria is requested. A single data record that meets the predefined testing criteria is pulled from a production environment. The data record is sanitized by identifying nonpublic personal information (NPI) and algorithmically replacing the NPI data with fictitious data. Subsequently, either the data record or the sanitized data record is iteratively cloned until the specified number is generated. Cloning involves algorithmically replacing the NPI data in the data record with other fictitious data or replacing the fictitious data in one of sanitized data records with other fictitious data. In addition, as a means maintaining integration between the tables and files that include the data record and the applications that use the data, the sanitization process also involves replacing a primary key value associated with the data record being sanitized with a different primary key value that is unique to other primary keys associated with other sanitized data records included in the set.

7 Claims, 5 Drawing Sheets

CLONING OF SANITIZED DATA RECORDS FOR USE IN DATA TESTING ENVIRONMENTS

FIELD OF THE INVENTION

The present invention relates to provisioning sanitized test data and, more specifically, the reproduction, otherwise referred to as cloning, of sanitized data records for provisioning into data testing environments.

BACKGROUND

Large enterprises that execute a multitude of different software applications on various different computing platforms require stringent testing of the software applications prior to initial production use or when the software applications undergo updates/revisions. In order to ensure that once the software applications are released for production use that they perform efficiently and without problems, the testing of such software applications requires the use of data that mirrors the data used in the production environment.

In large enterprises the process by which data is provisioned from the production environment to the testing environment is inefficient and, in some instances, ineffective. This is because in most instances a "single point generation" process is used to move data from the production environment to a loading/landing point where the data is made available to the test environment. The problem with such process is that if a sizable number of files and/or tables are pulled from the production environment, each of these files and/or tables are fully integrated with other across hundreds of different software applications within a pipeline. As a result, the associations between files and tables must be maintained or the applications will not integrate with each other and testing will fail.

In the event that the production environment uses data records that include nonpublic personal information (NPI) (e.g., name, electronic and physical addresses, telephone numbers, social security numbers, drivers license numbers and the like), a need to exist to remove such data from the data records prior to making it available to the test environment to limit NPI data exposure. Such a process, referred to herein as "sanitization" requires the use of sanitization algorithms, which identify and replace the NPI data with fictitious data (i.e., fake names, addresses, telephone numbers and the like). This fictitious data is required to be consistent across all the files/tables, so that when the data is inserted into all related files/tables and the hundreds of software applications that utilize the files/table, the files/tables and applications are in absolute synchronization with each other.

The sanitization and integration maintenance processes are laborious tasks. For example, in one instance, in which approximately 5,000 files/tables which are used across approximately 100 software applications, the overall process by which data is pulled from production, undergoes sanitization and is made available to the testing environments, may take months to complete.

Therefore, a need exists to develop systems, computer-implemented methods, computer program products and the like that add efficiency to the process by which data is extracted from a production environment, sanitized and made available to lower lane test environments, while maintaining required integration between tables/files that include the data and applicable software applications that use such tables/files.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-implemented methods, computer program products and the like that provide for generating a set of sanitized data records for provisioning to data testing environments. The present invention eliminates the need to identify and sanitize a large volume of data records by implementing a cloning process, in which, a single data record meeting requested data criteria can be pulled from production and cloned into multiple different data records which also meet the requested data criteria. Specifically, the single data record or a subsequent sanitized version of the single data record is cloned by algorithmically replacing identified nonpublic personal information (NPI) data with fictitious data, while maintaining the other entries/characteristics of the data record. The cloning continues iteratively until a predetermined number of requested data records are generated. In this regard, each cloned/replicated data record will have different NPI data, while other entries in the data record are maintained throughout.

In addition, the cloning process provides for algorithmically replacing a primary key value assigned to the data record or a sanitized data record with a unique primary key value, such that, each cloned sanitized data record has its own unique primary key value. Subsequently, the unique primary keys are generated/populated across all associated tables to maintain the integration between the data records and the tables.

A system for providing sanitized data records for provisioning to a data testing environment defines first embodiments of the invention. The system includes a computing platform including a memory and at least one processing device in communication with the memory. The memory stores instructions that are executable by the at least one processing device. The instructions are configured to receive a request that requires a set of sanitized data records of a predetermined quantity that meets predetermined test data criteria. In response to receiving the request, the instructions are further configured to capture a single data record from a data production environment that meets the predetermined test data criteria and includes nonpublic personal information (NPI) data. Once the data record has been captured it is moved to a staging area, where the instructions are further configured to create a sanitized data record by algorithmically replacing data entries in the data record that comprise nonpublic personal information (NPI) data with fictitious data. In addition, the instructions are further configured to create further sanitized data records. The further sanitized data records are created from either the data record or a sanitized data record. Creation of further sanitized data records occurs iteratively until the predetermined quantity of sanitized data records in the set have been created. Lastly, the instructions are configured to store the set of sanitized data records in a data repository, which is accessible to the data testing environment for retrieving and performing testing on the sanitized data records.

In specific embodiments of the system, the instructions configured to create the further sanitized data records are further configured to create the further sanitized data records by algorithmically replacing the data entries in the data record that comprise NPI data with other fictitious data. In other words, the initially captured data record is repeatedly cloned until the predetermined quantity of requested data records are created (i.e., the set is completed). In related embodiments of the system, the other fictitious data in any one sanitized data record is different from fictitious data in any other sanitized data record in the set.

In other specific embodiments of the system, the instructions configured to create the further sanitized data records are further configured to create the further sanitized data records by algorithmically replacing the fictitious data in another sanitized data record with other fictitious data. In other words, each resulting sanitized data record is subsequently cloned/sanitized (i.e., sanitizing the sanitized data record) until the predetermined quantity of requested data records are created (i.e., the set is completed). In related embodiments of the system, the other fictitious data in any one sanitized data record is different from fictitious data in any other sanitized data record in the set.

In further specific embodiments of the system, the instructions configured to create the sanitized data record and the further sanitized data records are further configured to algorithmically replace a primary key value associated with the data record, the sanitized data record or a further sanitized data record with a different primary key value. The different primary key is unique to other primary keys values associated with other sanitized data records in the set. In related embodiments of the system, the instructions are further configured to maintain integration between at least one of (i) the data record and associated tables and (ii) the associated tables and associated applications, by generating the primary key value associated with each sanitized data record in the set across the associated tables and/or applications.

In still further specific embodiments of the system, the instructions are further configured to, for each iterative creation of a sanitized data record, replace lookup files that are used to determine fictitious data for the sanitized data records in the set.

A computer-implemented method for providing sanitized data records for provisioning to a data testing environment defines second embodiments of the invention. The computer-implemented method is executed by one or more computing device processors. The method includes receiving a request that requires a set of sanitized data records of a predetermined quantity that meets predetermined test data criteria and, in response to receiving the request, capturing a data record from a data production environment that meets the predetermined test data criteria and includes nonpublic personal information (NPI) data. The method further includes creating a sanitized data record by algorithmically replacing data entries in the data record that comprise nonpublic personal information (NPI) data with fictitious data and creating further sanitized data records for the set iteratively until the predetermined quantity of sanitized data records are created. The further sanitized data records are created by cloning one of the data record or the sanitized data record. The method further includes storing the set of sanitized data records in a data repository, which is accessible to the data testing environment for retrieving and performing testing on the sanitized data records.

In specific embodiments of the computer-implemented method, creating the further sanitized data records further includes creating the further sanitized data records by algorithmically replacing the data entries in the data record that comprise NPI data with other fictitious data. In other words, the initial data record is iteratively cloned until the predetermined quantity of sanitized data records results. In such embodiments of the method, the other fictitious data in any one sanitized data record may be different from fictitious data in any other sanitized data record in the set.

In further specific embodiments of the computer-implemented method, creating the further sanitized data records further includes creating the further sanitized data records by algorithmically replacing the fictitious data in another sanitized data record with other fictitious data. In other words, each resulting sanitized data record is subsequently cloned/sanitized (i.e., sanitizing the sanitized data record) until the predetermined quantity of requested data records are created. In related embodiments of the method, the other fictitious data in any one sanitized data record may be different from fictitious data in any other sanitized data record in the set.

In still further specific embodiments of the computer-implemented method, creating the sanitized data record and the further data records further includes algorithmically replacing a primary key value associated with either the data record, the sanitized data record or a further sanitized data record with a different primary key value. The different primary key is unique to other primary keys values associated with other sanitized data records in the set. In related embodiments the computer-implemented method further includes maintaining integration between (i) the data record and associated tables and/or (ii) the associated tables and associated applications by generating the primary key value associated with each sanitized data record in the set across the associated tables and/or the associated applications.

A computer program product including non-transitory computer-readable medium defines third embodiments of the invention. The computer-readable medium includes a first set of codes configured to cause a computing device processor to receive a request that requires a set of sanitized data records of a predetermined quantity that meets predetermined test data criteria. The computer-readable medium additionally includes a second set of codes configured to cause a computing device processor to, in response to receiving the request, capture a data record from a data production environment that meets the predetermined test data criteria and includes nonpublic personal information (NPI) data. Further, the computer-readable medium includes a third set of codes configured to cause a computing device processor to create a sanitized data record by algorithmically replacing data entries in the data record that comprise nonpublic personal information (NPI) data with fictitious data. In addition, the computer-readable medium includes a fourth set of codes configured to cause a computing device processor to create further sanitized data records iteratively until the predetermined quantity of sanitized data records are created. The further sanitized data records are created from one of the data record or the sanitized data record. Moreover, the computer-readable medium includes a fifth set of codes for causing a computing processor device to store the set of sanitized data records in a data repository, which is accessible to the data testing environment for retrieving and performing testing on the sanitized data records.

In specific embodiments of the computer program product, the fourth set of codes is further configured to cause the computing device processor to create the further sanitized data records by algorithmically replacing the data entries in the data record that comprise NPI data with other fictitious data.

In other specific embodiments of the computer program product, the fourth set of codes is further configured to cause the computing device processor to create the further sanitized data records by algorithmically replacing the fictitious data in another sanitized data record with other fictitious data.

In specific related embodiments of the computer program product, the other fictitious data in any one sanitized data record is different from fictitious data in any other sanitized data record in the set.

Moreover, in further specific embodiments of the computer program product, the third and the fourth set of codes are further configured to cause the computing device processor to algorithmically replace a primary key value associated with either the data record, the sanitized data record or a further sanitized data record with a different primary key value. The different primary key is unique to other primary keys values associated with other sanitized data records in the set. In related embodiments the computer-readable medium of the computer program product additionally includes a sixth set of codes for causing a computing device processor to maintain integration between at least one of (i) the data record and associated tables and the associated tables and/or (ii) associated applications by generating the primary key value associated with each sanitized data record in the set across the associated tables and/or the associated applications.

Thus, systems, apparatus, methods, and computer program products herein described in detail below provide for replicating/cloning sanitized data records for purposes of creating a predetermined quantity of data records that meet requested testing criteria. Specifically, a single data record captured from a production environment is sanitized, i.e., the NPI data is algorithmically replaced with fictitious data. Subsequently, the single data record is repetitively sanitized, or the resulting sanitized data record is re-sanitized (i.e., the fictitious data is replaced with other/different fictitious data. This process iteratively continues until the predetermined quantity of data records results. In addition, in order to insure that integration between the data records is maintained across all associated tables/files, the sanitization process also involves replacing an existing primary key with a new unique primary key, which is then populated across the associated tables/files.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for provide for generating a set of sanitized data records for provisioning to data testing environments. As previously discussed, large enterprises, such as financial institutions or the like have need to test new implementations of or revisions to software applications prior to releasing them to the production environment. In order to simulate the production environment within the testing environment, data records are copied the production environment, undergo sanitization in which non-public personal information (NPI) data is replace with fictitious data before being stored and subsequently loaded into the test environment. However, in such a process, if a large volume of data records with specific testing criteria are pulled from production that are included within an even larger volume of files/tables that are fully integrated across a large volume of software application, the process by which data is pulled from production, identified, sanitized and loaded for testing environment user is extremely time consuming. For example, in certain instances the entire process may take months to complete.

The present invention eliminates the need to identify and sanitize a large volume of data records by implementing a cloning process, in which, a single data record meeting requested data criteria can be pulled from production and cloned into multiple different data records which also meet the requested data criteria. Specifically, the single data record or a subsequent sanitized version of the single data record is cloned by algorithmically replacing identified nonpublic personal information (NPI) data with fictitious data, while maintaining the other entries/characteristics of the data record. The cloning continues iteratively until a predetermined number of requested data records are generated. In this regard, each cloned/replicated data record will have different NPI data, while other entries in the data record are maintained throughout.

In addition, the cloning process provides for algorithmically replacing a primary key value assigned to the data record or a sanitized data record with a unique primary key value, such that, each cloned sanitized data record has its own unique primary key value. Subsequently, the unique primary keys are generated/populated across all associated tables to maintain the integration between the data records and the tables.

Figure 1:
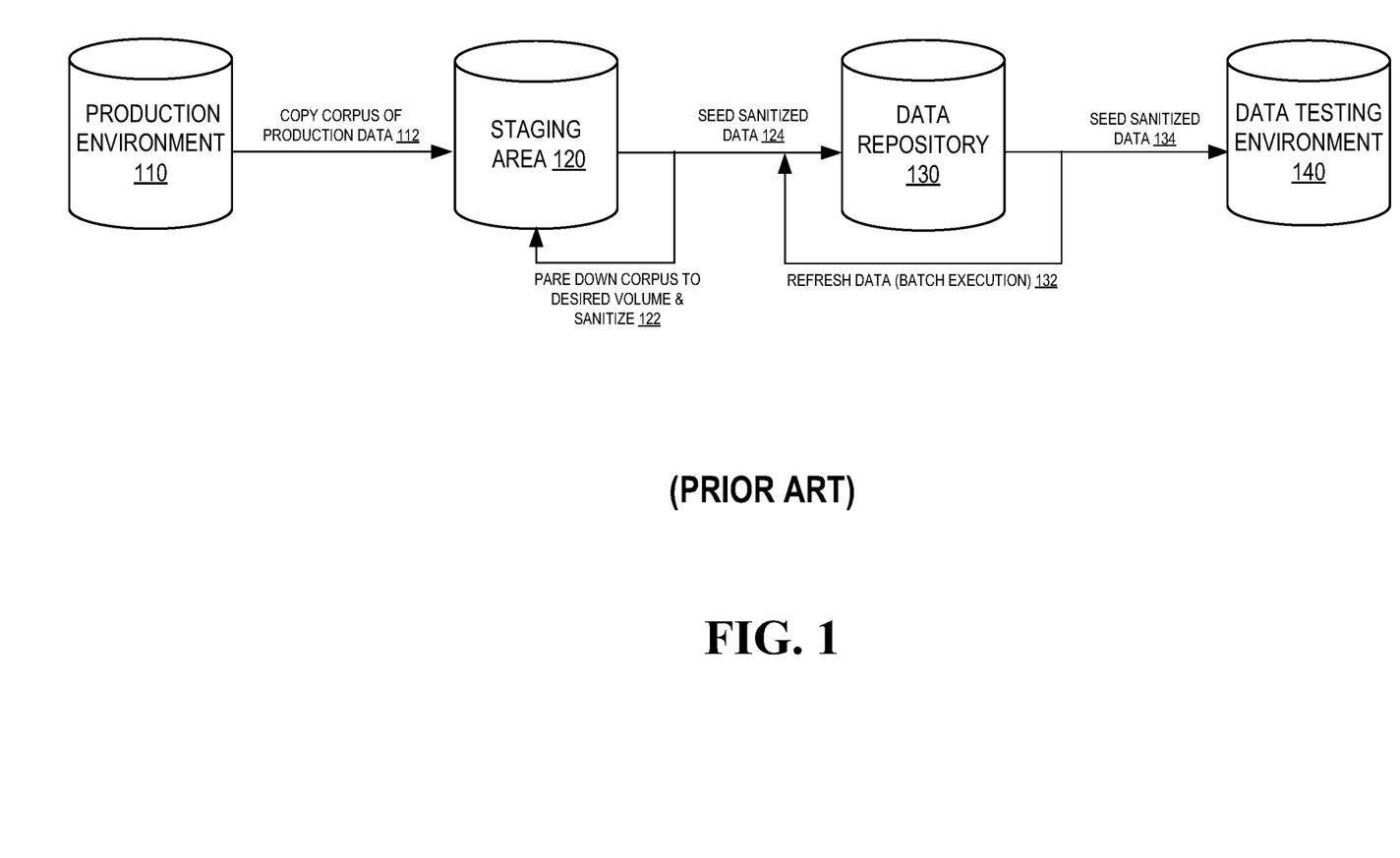
FIG. 1 is a schematic diagram of a system for copying data from a production environment, sanitizing the data and seeding the sanitized data in a data testing environment, in accordance with the prior art.

FIG. 1 is a schematic diagram of a system 100 configured for sanitization of data prior to seeding data for use in a data testing environment, in accordance with the prior art. In current processing, at Event 112, an entire corpus of data records is copied from a production environment 110 and stored in staging area 120. Once the corpus of data records has been moved to the staging area 120, at Event 122, the entire corpus of data records is pared down to a desired volume of data records that meet requisite data testing criteria and the pared down is sanitized (i.e., the NPI data is replaced with fictitious data within each pared down data record). This current process, by which data records are pared down and sanitized, is, in many instances, an inefficient process, which in certain instances can take months to complete. Once the pared down data records have been identified and sanitized, at Event 124, the data records are seeded/stored in a data repository 130. At Event 132, the data records undergo a periodic refresh process to ensure that the data in the data records is up-to-date. For example, a batch execution process may be run on a daily basis or the like to update all of the data records stored within the data repository 130. For example, in a financial institution setting, updating the data records on a daily basis will ensure that the data records reflect any previous day activities associated with the data record (e.g., previous day financial transactions or other interactions associated with a client/customer data record or the like). At Event 134, a tester conducting tests within the data testing environment may access the data repository 130 to load specific data records as dictated by the tester's current testing criteria.

Figure 2:
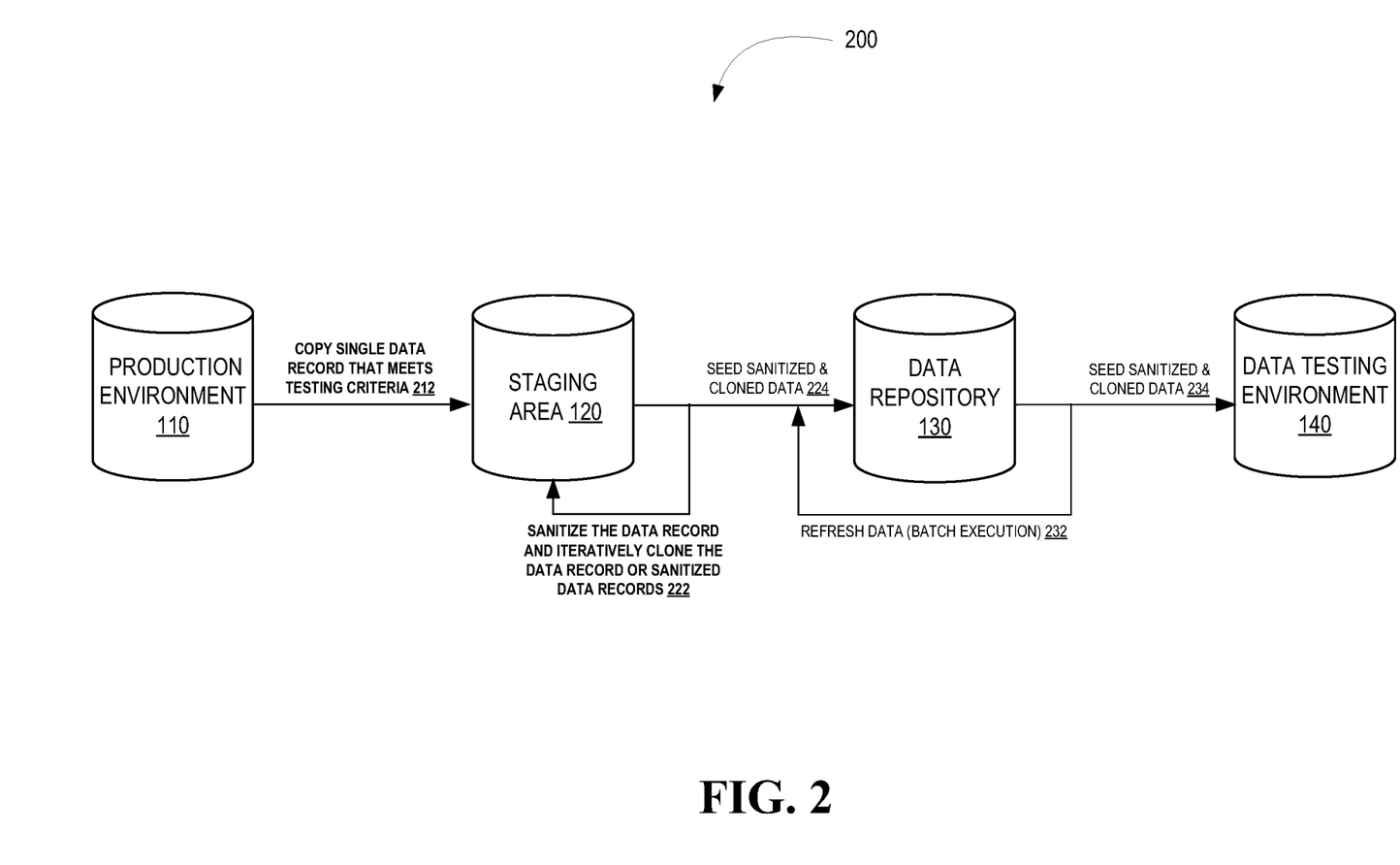
FIG. 2 is a schematic diagram of system for copying a single data record from a production environment, sanitizing the single data record, cloning further sanitized records and seeding the sanitized data records in a data testing environment, in accordance with embodiments of the present invention.

Referring to FIG. 2 a schematic diagram is depicted of a system 200 for cloning/replicating sanitized data records for provisioning to a data testing environment, in accordance with alternate embodiments of the present invention. At Event 212, a single data record that meets requested testing criteria is copied/pulled from the production environment 110. For example, in a financial institution scenario, the data record may be a customer/client record and the data testing criteria may be a certain range of personal data in which the customer is included (e.g., date of birth, geographic location, account balance or the like) or the data testing criteria may be inclusion of a specific financial transaction/interaction in the customer/client record. Unlike conventional test data provisioning, according to embodiments of the present invention there is no need to copy the entire corpus of data records and subsequently pare down the data records identified as meeting the testing criteria and testing quantity.

Once the single data record has been pulled from the production environment 110 and moved to a staging area 120, at Event 222, the data record is sanitized by implementing algorithms to identify and replace all the nonpublic personal information (NPI) data entries with fictitious data. As previously discussed, NPI includes, but is not limited to, names, physical and electronic addresses, telephone numbers, social security numbers, driver license numbers, account numbers and the like. As such, the fictitious data may include, but is not limited to, fake names, addresses, telephone number and the like, which may or may not be perceived as real data. Any known or future known algorithm may be used to sanitize data records.

Once the initial sanitized data record has been created, further sanitized data records are created iteratively from the initial data record or from the sanitized data record until the predetermined requested quantity of data records is created. For example, a user/tester may request five hundred data records that meet predefined data testing criteria, as a result, once the initial sanitized data record is created, four hundred and ninety-nine additional data records will iteratively be created. In specific embodiments of the invention, the further sanitized data records are created by repeatedly sanitizing the initial data record while in other embodiments of the invention, the further sanitized data records are created by cloning/replication sanitized data records (e.g., the initial sanitized record is sanitized to create a second sanitized data record, the second sanitized record is sanitized to create a third sanitized data record and so on until the requested quantity of data records is created. It should be noted that while the NPI data with all of the created sanitized records will differ, the remaining data entries with the data record will remain the same. For example, in the financial institution scenario, in which the data record is a customer/client record, all of the specific account details (e.g., balances, transactions and the like) will remain the same throughout the specified quantity of sanitized customer/client records that are being provisioned to the testing environment.

Once the requested quantity of data records has been created, at Event 224, the data records are seeded/stored in a data repository 130. At Event 232, similar to the current process, the data records undergo a periodic refresh process to ensure that the data in the data records is up-to-date. At Event 234, a tester conducting tests within the data testing environment may access the data repository 130 to load specific data records as dictated by the tester's current testing criteria.

Figure 3:
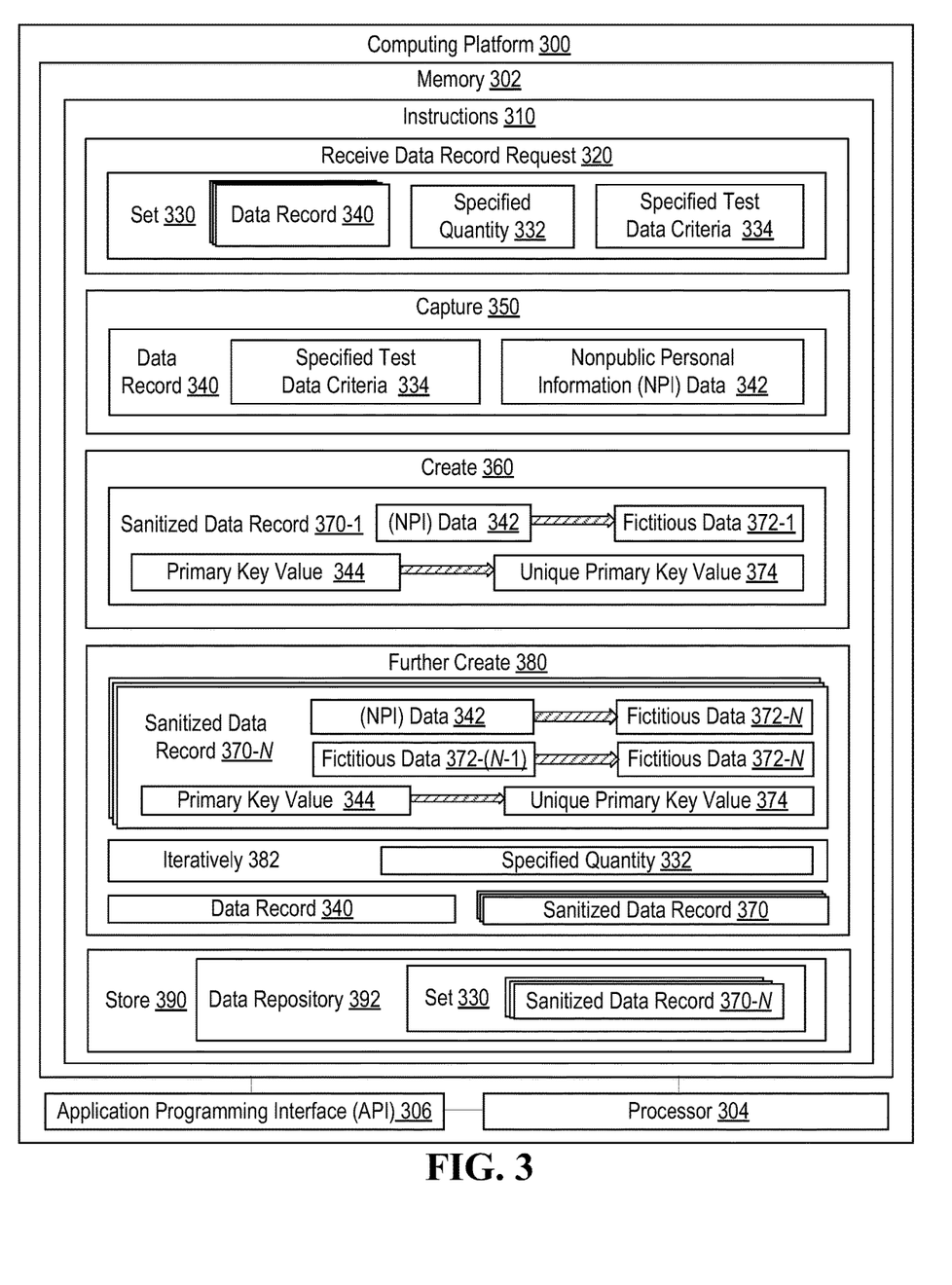
FIG. 3 is a block diagram of a computing platform configured for cloning/replicating sanitized data records for seeding in data test environments, in accordance with embodiments of the present invention.

Referring to FIG. 3, depicted is computing platform 300 configured for cloning/replication data records for provisioning to a data testing environment, in accordance with embodiments of the present invention. In addition to providing greater detail, FIG. 3 highlights various alternative embodiments of the invention. The computing platform 200 may comprise one or more computing devices (e.g., server(s), storage devices or the like) and is configured to execute engines, including instructions, algorithms, modules, routines, applications and the like. Computing platform 300 includes memory 302 and the like which may comprise volatile and non-volatile memory, such as read-only and/or random-access memory (RAM and ROM), EPROM, EEPROM, flash cards, or any memory common to computing platforms). Moreover, memory 302 and the like may comprise cloud storage, such as provided by a cloud storage service and/or a cloud connection service.

Further, computing platform 300 also includes at least one processor 304, otherwise referred to as a processing device or the like which may be an application-specific integrated circuit ("ASIC"), or other chipset, logic circuit, or other data processing device configured to execute instructions 310. Processor(s) 304 or the like may execute one or more application programming interface (APIs) 306 that interface with any resident programs, such as instructions 310 or the like stored in the memory 302 of the computing platform 300 and any external programs. Processor(s) 304 may include various processing subsystems (not shown in FIG. 3) embodied in hardware, firmware, software, and combinations thereof, that enable the functionality of computing platform 300 and the operability of computing platform 300 on a distributed communications network. For example, processing subsystems allow for initiating and maintaining communications and exchanging data with other networked computing platforms and devices. For the disclosed aspects, processing subsystems of computing platform 300 may include any processing subsystem used in conjunction with instructions 310 and related engines, tools, routines, subroutines, algorithms, sub-algorithms, sub-modules thereof.

Computing platform 300 may additionally include a communications module (not shown in FIG. 3) embodied in hardware, firmware, software, and combinations thereof, that enables electronic communications between computing platform 300 and other network computing platforms and devices. Thus, communication module may include the requisite hardware, firmware, software and/or combinations thereof for establishing and maintaining a network communication connection with one or more computing platforms and/or network devices.

Memory 302 of second computing platform 300 stores instructions 310 that are configured to receive a request 320 for a set 330 of data records 340 of a specified quantity 332 and meeting specified test data criteria 334. The request may be input provided by a user/tester at a user interface configured to receive such requests. The specified quantity 332 of data records 340 in the set 330 is typically a significant quantity but may be any quantity greater than one. As previously discussed, the test data criteria 334 may be any characteristic/data found in the data record. For example, in the financial institution scenario, in which the data record 340 may be a customer/client record the test data criteria may be a specific characteristic of the customer (e.g., date of birth, geographic location) or specific characteristic of a customer/client account (e.g., balance over a specified amount) or specific transactions/interactions included in the customer/client record.

Instructions 310 are further configured to, in response to receiving the request 320, capture 350 a single data record 340 from a data production environment that meets the specified test data criteria 334. The data record 340 characteristically includes NPI data 342. Once the data record 340 has been captured and move to a staging area, the instructions 310 are configured to create 350 a sanitized data record 370-1, otherwise referred to as a sanitized version of the data record. The sanitized data record 370-1 is created by algorithmically replacing the NPI data 342 entries with fictitious data 372. As previously discussed, in specific embodiments of the invention, the fictitious data is data that is perceived to be real data, while in other embodiments of the invention, one or more of the fictitious data entries is data that is not perceived as real.

In additional embodiments of the invention, creating 360 the sanitized data record 370-1 further includes algorithmically replacing the primary key value 344 or any other data record identifier with another unique primary key value 374 or other data record identifier. Unique primary key values 374 in the sanitized data record 370-1 provide for each sanitized data record 370 in the set 330 to have their own unique identifier. Such unique identification is necessary to maintain integration between the data records and files/tables that include the data record and/or the files/tables that include the data record and software applications that rely on the files/tables.

Instructions 310 are additionally configured to further create 380 additional sanitized data records 370, iteratively 382, until the specified quantity 332 (i.e., 370-N, when N is the specified quantity) is created. As previously discussed, the additional sanitized data records 370 are created from the initial data record 340 or any one of the additional/further sanitized data records 370. For example, in specific embodiments of the invention the initial data record 340 is repeatedly cloned by algorithmically replacing the NPI data 342 with different fictitious data 372 (i.e., each cloned version of the initial data record 340 has different fictitious data 372). In other specific embodiments of the invention, each sanitized data record 370 is cloned by algorithmically replacing the fictitious data 372 with other/different fictitious data 372. (e.g., the fictitious data 372-1 in the initial sanitized data record 370-1 is replaced with new fictitious data 372-2 in the second sanitized data record the fictitious data 372-(N–1) is replaced with new fictitious data 372-N in the Nth sanitized data record (i.e., last sanitized data record in the set 330).

In additional embodiments of the invention, creating 360 the further sanitized data records 370-2-370-N) further includes algorithmically replacing the primary key value 344 or any other data record identifier with another unique primary key value 374 or other data record identifier. In specific embodiments of the invention, once the unique primary key values 374 have been generated that are populated across files/tables and/or applications to maintain integration between the data records and files/tables that include the data record and/or the files/tables that include the data record and software applications that rely on the files/tables.

Once the set 330 of sanitized data records 370 have been created, instructions 310 are further configured to store 390 the set 330 of sanitized data records 370 (i.e., 370-1-370-N) in a data repository 392, which is accessible to a user/tester to retrieve and perform testing on the sanitized data records 370.

Figure 4:
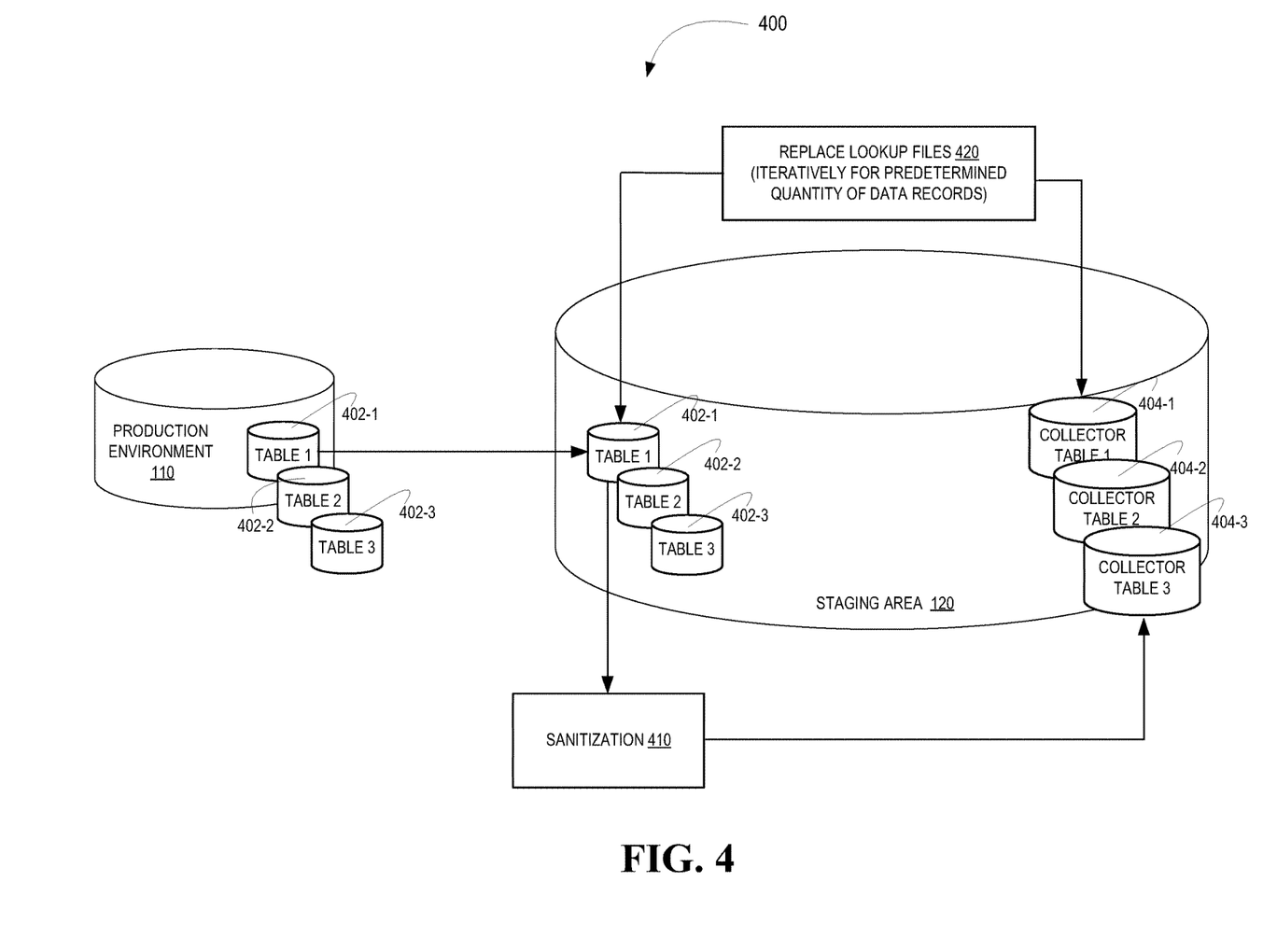
FIG. 4 is a schematic/flow diagram of a system/method for cloning/replicating sanitized data records for seeding in data test environments, in accordance with embodiments of the present invention.

Referring to FIG. 4, a schematic/flow diagram is depicted of a methodology 400 for cloning/replicating sanitized data records for provisioning in a data testing environment, in accordance with embodiments of the present invention. Specifically, in the embodiment shown in FIG. 4, data records from three different tables; Table 1 402-1, Table 2 402-2 and Table 3 402-3 are copied/pulled from a production environment 110 and moved to a staging area 120.

A data record from Table-1 402-1 undergoes sanitization 410, in which the NPI data is replaced with fictitious data (e.g., in the financial institution embodiment, in which the data record is associated with a customer account, the account number, the account name and the like are replaced with a fictitious account number, account name and the like). Once the sanitized data record is created it is collected at Collector Table-1 404-1.

In addition, in those embodiments of the invention, in which the sanitization 410 process in conducted by repeatedly replacing the NPI in the data record with different fictitious values, the lookup files 420 are replaced. Each lookup file has a has a set of unique values, such that if lookup file 1 is used to generate fictitious values it will result in specific fictitious data values and if lookup file 2 is used to generate fictitious values it will result in different specific fictitious values. The fictitious values are generated/looked up in the lookup files by using hash values generated from each side and subsequently matching the hash values. Thus, a new lookup file is needed for each iteration of the sanitization process to ensure that the NPI data in the data record results in unique fictitious data values.

It should be noted that in those embodiments of the invention in which the sanitized data records are iteratively created by algorithmically replacing fictitious data in one sanitized data record with other fictitious data (i.e., so-called sanitizing the sanitized record), there is no need to replace look up tables, since the data that is being replaced (i.e., the fictitious data) will be different in each resulting sanitized data record. In other words, the same lookup file can be used throughout the iterative sanitization process.

Once the process has completed the iterative cloning and sanitization process for one data record in Table-1 402-1, the process will be repeated for other applicable data records in Table-1 402-1. Once all the applicable data records in Table-1 402-1 have been processed, the applicable data records in Table-2 402-2 are processed and so on.

Figure 5:
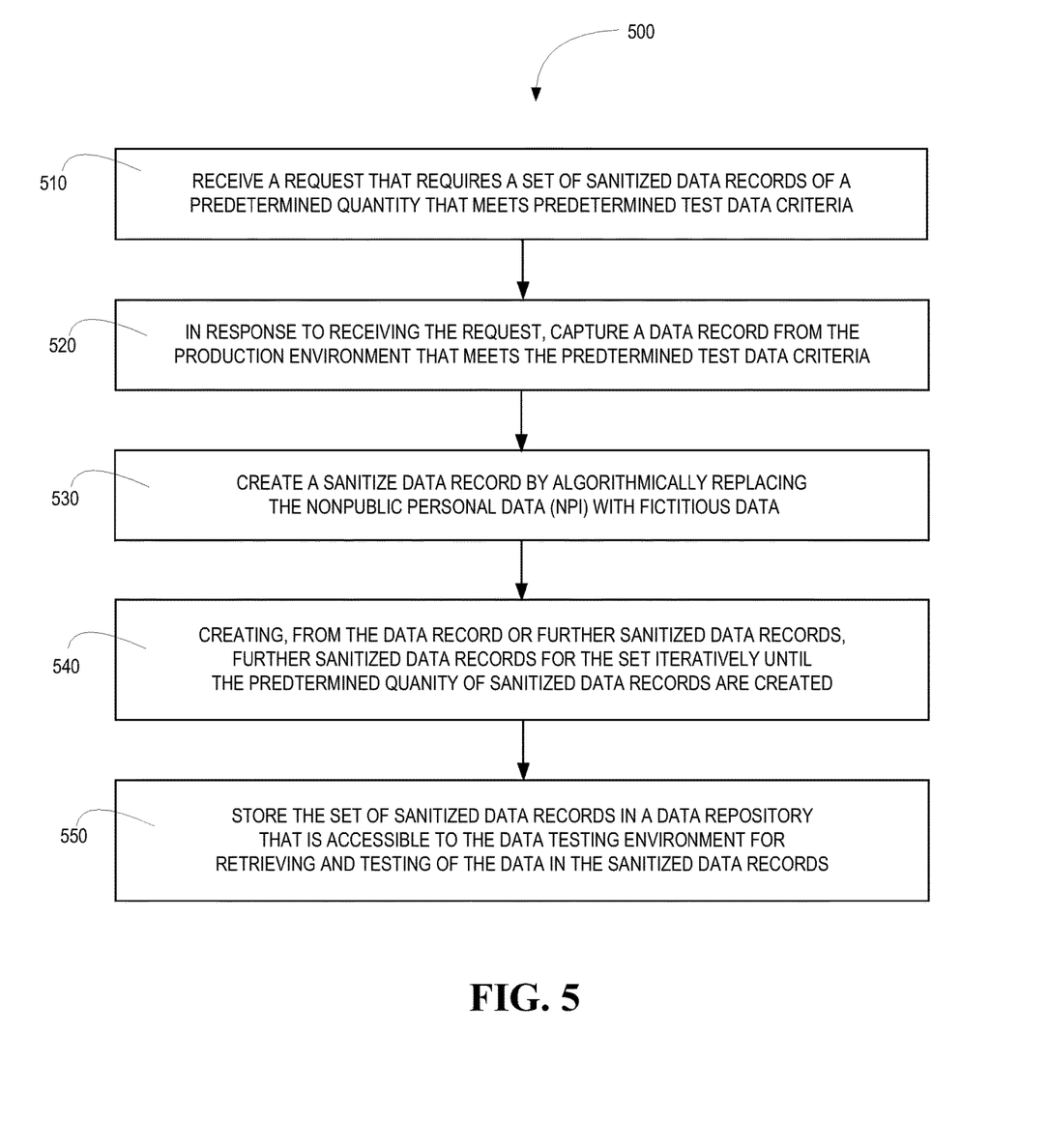
FIG. 5 is a flow diagram of a method for cloning/replicating sanitized data records for seeding in data test environments, in accordance with embodiments of the present invention.

Referring to FIG. 5, a depicted is flow diagram of a method 500 for cloning/replicating sanitized data records for provisioning in a data testing environment, in accordance with embodiments of the present invention. At Event 510, a request is received that requires a set of sanitized data records of a predetermined quantity and meeting predetermined test data criteria. The request may be input provided by a user/tester at a user interface configured to receive such requests. The specified quantity of sanitized data records is typically a significant quantity but may be any quantity greater than one. As previously discussed, the test data criteria may be any characteristic/data included in the data record. For example, in the financial institution scenario, in which the data record may be a customer/client record the test data criteria may be a specific characteristic of the customer (e.g., date of birth, geographic location and the like) or specific characteristic of a customer/client account (e.g., balance over a specified amount) or specific transactions/interactions included in the customer/client record.

In response to receiving the request, at Event 520, a single data record is captured/copied from a data production environment that meets the specified test data criteria. The data record characteristically includes NPI data.

Once the data record has been captured and moved to a staging area, at Event 530, a sanitized version of the data record is created by algorithmically replacing the NPI data entries with fictitious data. Additionally, in specific embodiments of the invention, the sanitization process includes algorithmically replacing the primary key value/identifier with a new primary key value that is unique to other primary key values used to identifier other sanitized data records in the set.

At Event 540, further sanitized data records are created from either the initial data record or one of the sanitized versions of the data record. Further sanitized data records are iteratively created until the requested quantity of sanitized data records in the set have been created. In specific embodiments of the invention the initial data record is repeatedly cloned by algorithmically replacing the NPI data with different fictitious data (i.e., each new/cloned sanitized version of the initial data record has different fictitious data). In other specific embodiments of the invention, each sanitized data record is cloned by algorithmically replacing the fictitious data in a preceding sanitized data record with other/different fictitious data, so-called "sanitizing of a sanitized version". As previously discussed, while each sanitized data record in the set will have different fictitious data in place of the NPI data, the other data entries in the data record will remain constant across all the sanitized data records in the set. Additionally, in specific embodiments of the invention, creating the further sanitized data records further includes algorithmically replacing the primary key value or any other data record identifier with another unique primary key value or other unique data record identifier. In further specific embodiments of the invention, once the unique primary key values have been generated that are populated across files/tables and/or applications to maintain integration between the data records and files/tables that include the data record and/or the files/tables that include the data record and software applications that rely on the files/tables.

In response to creating the set of sanitized data records, At Event 550, the set of sanitized data records are stored in a data repository, which is accessible to a user/tester to retrieve and perform testing on the sanitized data records.

As evident from the preceding description, the systems, methods and the like described herein represents an improvement in technology, specifically, embodiments of the present invention provide for cloning/replicating sanitized data records for subsequent provisioning in data test environments. As such, a single data record that meets predefined testing criteria can be captured from a production environment. The data record is sanitized by identifying nonpublic personal information (NPI) and algorithmically replacing the NPI data with fictitious data. Subsequently, a predetermined quantity of cloned data records is created by algorithmically replacing the NPI data in the data record with other fictitious data or replacing the fictitious data in one of sanitized data records with other fictitious data. In addition, as a means maintaining integration between the tables and files that include the data record and the applications that use data in the data record, the sanitization process also involves replacing a primary key value associated with the data record being sanitized with a different primary key value that is unique to other primary keys associated with other sanitized data records included in the set.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing sanitized data records for use in a data testing environment, the system comprising:
    a computing platform including a memory and at least one processing device in communication with the memory, wherein the memory stores instructions that are executable by the at least one processing device and are configured to:
        receive a request that requires a set of sanitized data records of a predetermined quantity that meets predetermined test data criteria;
        in response to receiving the request, capture a data record from a data production environment that meets the predetermined test data criteria and includes nonpublic personal information (NPI) data;
        create a sanitized data record by algorithmically replacing (i) data entries in the data record that comprise nonpublic personal information (NPI) data with fictitious data, and (ii) a primary key value associated with the data record with a different primary key value;
        create further sanitized data records for the set by algorithmically replacing, in the data record or a previously sanitized data record, (i) the data entries that comprise NPI data with fictitious data and (ii) a primary key value associated with the data record or the previously sanitized data record with a different primary key value, wherein creating further sanitized data records occurs iteratively until the predetermined quantity of sanitized data records are created, and wherein each of the sanitized data records in the set includes fictitious data and primary key values that are unique to each sanitized data record;
        maintain integration between the sanitized data records and associated tables by generating the primary key value associated with each sanitized data record in the set across the associated tables; and
        store the set of sanitized data records in a data repository, wherein the data repository is accessible to the data testing environment for retrieving and performing testing on the sanitized data records.

2. The system of claim 1, wherein the instructions are further configured to maintain integration between the associated tables and associated applications by generating the primary key value associated with each sanitized data record in the set across the associated applications.

3. The system of claim 1, wherein the instructions are further configured to:
    for each iterative creation of a sanitized data record, replace lookup files that are used to determine fictitious data for the sanitized data records in the set.

4. A computer-implemented method for providing sanitized data records for use in a data testing environment, the computer-implemented method is executed by one or more computing device processors and comprises:
    receiving a request that requires a set of sanitized data records of a predetermined quantity that meets predetermined test data criteria;
    in response to receiving the request, capturing a data record from a data production environment that meets the predetermined test data criteria and includes nonpublic personal information (NPI) data;
    creating a sanitized data record by algorithmically replacing (i) data entries in the data record that comprise nonpublic personal information (NPI) data with fictitious data, and (ii) a primary key value associated with the data record with a different primary key value;
    creating further sanitized data records for the set by algorithmically replacing, in the data record or a previously sanitized data record, (i) the data entries that comprise NPI data with fictitious data and (ii) a primary key value associated with the data record or the previously sanitized data record with a different primary key value, wherein creating further sanitized data records occurs iteratively until the predetermined quantity of sanitized data records are created, and wherein each of the sanitized data records in the set includes fictitious data and primary key values that are unique to each sanitized data record;
    maintaining integration between the sanitized data records and associated tables by generating the primary key value associated with each sanitized data record in the set across the associated tables; and
    storing the set of sanitized data records in a data repository, wherein the data repository is accessible to the data testing environment for retrieving and performing testing on the sanitized data records.

5. The computer-implemented method of claim 4, further comprising maintaining integration between the associated tables and associated applications by generating the primary key value associated with each sanitized data record in the set across the associated applications.

6. A computer program product including non-transitory computer-readable medium that comprises:

a first set of codes configured to cause a computing device processor to receive a request that requires a set of sanitized data records of a predetermined quantity that meets predetermined test data criteria;

a second set of codes configured to cause a computing device processor to, in response to receiving the request, capture a data record from a data production environment that meets the predetermined test data criteria and includes nonpublic personal information (NPI) data;

a third set of codes configured to cause a computing device processor to create a sanitized data record by algorithmically replacing (i) data entries in the data record that comprise nonpublic personal information (NPI) data with fictitious data, and (ii) a primary key value associated with the data record with a different primary key value;

a fourth set of codes configured to cause a computing device processor to create further sanitized data records for the set by algorithmically replacing, in the data record or a previously sanitized data record, (i) the data entries that comprise NPI data with fictitious data and (ii) a primary key value associated with the data record or the previously sanitized data record with a different primary key value, wherein creating further sanitized data records occurs iteratively until the predetermined quantity of sanitized data records are created, and wherein each of the sanitized data records in the set includes fictitious data and primary key values that are unique to each sanitized data record;

a fifth set of codes for causing a computing device processor to maintain integration between the sanitized data records and associated tables by generating the primary key value associated with each sanitized data record in the set across the associated tables; and a sixth set of codes for causing a computing processor device to store the set of sanitized data records in a data repository, wherein the data repository is accessible to the data testing environment for retrieving and performing testing on the sanitized data records.

7. The computer program product of claim 6, wherein the fifth set of codes are further configured to cause the computing device processor to maintain integration between the associated tables and associated applications by generating the primary key value associated with each sanitized data record in the set across tables and the associated applications.

* * * * *